Patented Mar. 2, 1943

2,312,401

UNITED STATES PATENT OFFICE 2,312,401

DYESTUFFS OF THE ANTHRAQUINONE SERIES

Donald P. Graham, Wilmington, Del., assignor to E. I. du Pont de Nemours & Company, Wilmington, Del., a corporation of Delaware No Drawing. Application February 24, 1941, Serial No. 380,303

2 Claims. (Cl. 260—274)

This invention relates to the preparation of new dyestuffs of the anthraquinone series and more particularly to the preparation of fast olive to gray vat dyestuffs of the benzanthrone-anthraquinone acridine type.

The simplest member of the benzanthrone-anthraquinone-acridine series of dyes was originally disclosed in U. S. P. 995,936. The intermediate from which this dye was prepared is now generally considered to have the formula:

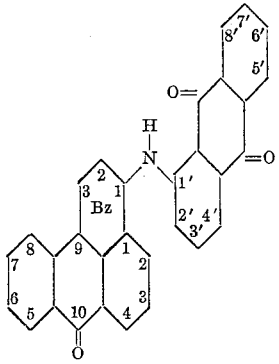

The numbering employed in this formula will be used throughout this specification and claims for the identification of the starting materials and intermediates.

It is the object of the present invention to prepare olive to gray vat dyestuffs which exhibit excellent fastness properties by the condensation of a Bz-1-anthraquinonyl-aminobenzanthrone which carries halogen in an alpha position on the benzanthrone nucleus with a 1-amino-anthraquinone-2-phenylazomethine and then subjecting the resulting compound to an alkaline condensation to effect ring closure of the Bz-1-anthraquinonylamino-benzanthrone groups to the acridine ring. In the condensation of the Bz-1-anthraquinonyl - aminobenzanthrone containing a halogen in an alpha position of the benzanthrone nucleus with the 1-amino-anthraquinone-2-phenylazomethine the condensation is apparently accompanied by a ring closure reaction prior to the alkaline fusion which effects ring closure of the acridine ring. It is believed that a phenylamine group splits out giving what may be an acridone or a mixture of acridones and acridines. The molecular configuration of this compound, however, has not been established and this invention is not to be limited by any theoretical formula that might be drawn to explain the possible condensation. The alpha- amino-anthraquinone employed may be further substituted by simple monovalent substituents or a heterocyclic ring. The 1-amino-anthraquinone-2-phenylazomethine also may contain simple monovalent substituents.

The following examples are given to illustrate the invention. The parts used are by weight.

Example 1

1-chloro-anthraquinone is condensed with acrolein in sulfuric acid (in the usual manner) to give an isomeric mixture of alpha-chlorobenzanthrones. This mixture is brominated in nitrobenzene with bromine and sulfuryl chloride, one bromine atom being introduced to give an isomeric mixture that will be referred to as alpha-chloro-Bz-1 - bromo - benzanthrone because from the manner of the synthesis of this product it is known that the chlorine is in one of the positions 4-, 5- or 8- in the benzanthrone molecule.

Seventeen parts of alpha-chloro-Bz-1-bromobenzanthrone, 11.5 parts of 1-amino-anthraquinone, 20 parts of soda ash, 2 parts of copper acetate and 0.2 part of copper powder are slurried in 170 parts of nitrobenzene and heated to 200–210° C. for two hours or longer. The charge is then cooled to 180° C. 17.5 parts of 1-aminoanthraquinone-2-phenylazomethine of the formula:

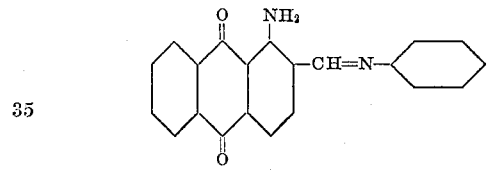

10.0 parts of soda ash, 1.0 part of copper acetate, and 0.1 part of copper powder are added and the charge heated to 200–210° for 10 to 15 hours to complete the second step of the condensation. It is then cooled to 70° C. and filtered. The cake is washed with 20 parts of nitrobenzene and then steam distilled free of solvent, filtered, washed with hot water and dried. Twenty parts of the above condensation product are ground to pass an 80 mesh screen and added slowly to a melt containing 200 parts of potassium hydroxide and enough ethyl alcohol to give a smooth melt, at 120° C. The fusion is heated during 2 to 3 hours to 165° (allowing some alcohol to distill over during the heating) and held at this temperature for one hour. It is then drowned in 3000 parts of cold water and stirred at or near the boil until the crude color is all precipitated by oxidation (aeration). The product is isolated by filtration, washed alkali free, dried, and ground to pass an 80 mesh screen. Fifteen parts of the pulverized fusion product are slurried in 300 parts of 96% sulfuric acid at 5-7° C. for 2 or 3 hours or until solution appears to be complete. At this point, the slurry is drowned in 3000 parts of cold water and filtered. The cake is washed acid free and pasted in the usual manner. The finished dyestuff is isolated as a dark olive paste dissolving in concentrated sulfuric acid with a green color and dyeing cotton in fast olive shades from a Bordeaux vat.

*Example 2*

Seventeen parts of alpha-chloro-Bz-1-bromobenzanthrone, 6 parts 1:5-diamino-anthraquinone, 20 parts soda ash, 2 parts copper acetate, and 0.2 part of copper powder are slurried in 170 parts of nitrobenzene and the charge heated with agitation to 200° C. It is stirred at 200-210° C. for two hours, cooled at 180° and 17.5 parts 1-amino-anthraquinone-2-phenylazomethine followed by 10 parts soda ash, 1 part copper acetate and 0.1 part copper powder added. The slurry is then heated to 200-210° for a period of 10 to 15 hours to complete the second phase of the condensation, cooled to 70° C. and filtered. The cake is washed with 20 parts of nitrobenzene, subjected to steam distillation until free of solvent, filtered, washed with hot water and dried. The condensation product is fused with alcoholic potash and the fusion product isolated and acid pasted as in Example 1. The final product, isolated as a dark olive paste dissolves in concentrated sulfuric acid with a green color and dyes cotton in brownish-olive shades from a Bordeaux brown vat.

The condensation as above described is based on the classical Ullmann reaction in which an amine is condensed with a halogen-containing compound in a solvent using a copper catalyst. The first step, i. e., the condensation of one molecular quantity of an alpha-amino-anthraquinone with the alpha-chloro-Bz-1-bromobenzanthrone takes place in the normal course with the replacement of the bromine atom in the Bz-1-position as this halogen is more reactive than the halogen in the alpha-position of the benzanthrone nucleus. The condensation of the 1-amino-anthraquinone-2-phenylazomethine which replaces the alpha-chloro-atom appears to take place, however, with a further simultaneous ring closure. The properties of this condensation product are quite different from those in which a simple —NH— linkage is present.

I claim:

1. The olive dyestuffs obtained by the condensation of a Bz-1-1'-anthraquinonylamino-benzanthrone which carries halogen in an alpha position of the benzanthrone nucleus with a 1-amino-anthraquinone-2-phenyl-azo-methine and subjecting the resulting condensation product to a caustic alkaline fusion.

2. The olive dyestuff obtained by the condensation of Bz-1-1'-anthraquinonylamino-benzanthrone which carries halogen in an alpha position of the benzanthrone nucleus with 1-amino-anthraquinone-2-phenyl-azo-methine and subjecting the resulting condensation product to a caustic alkaline fusion.

DONALD P. GRAHAM.